May 9, 1961
C. W. GANNETT
2,983,550
WHEEL
Filed March 31, 1959
2 Sheets-Sheet 1
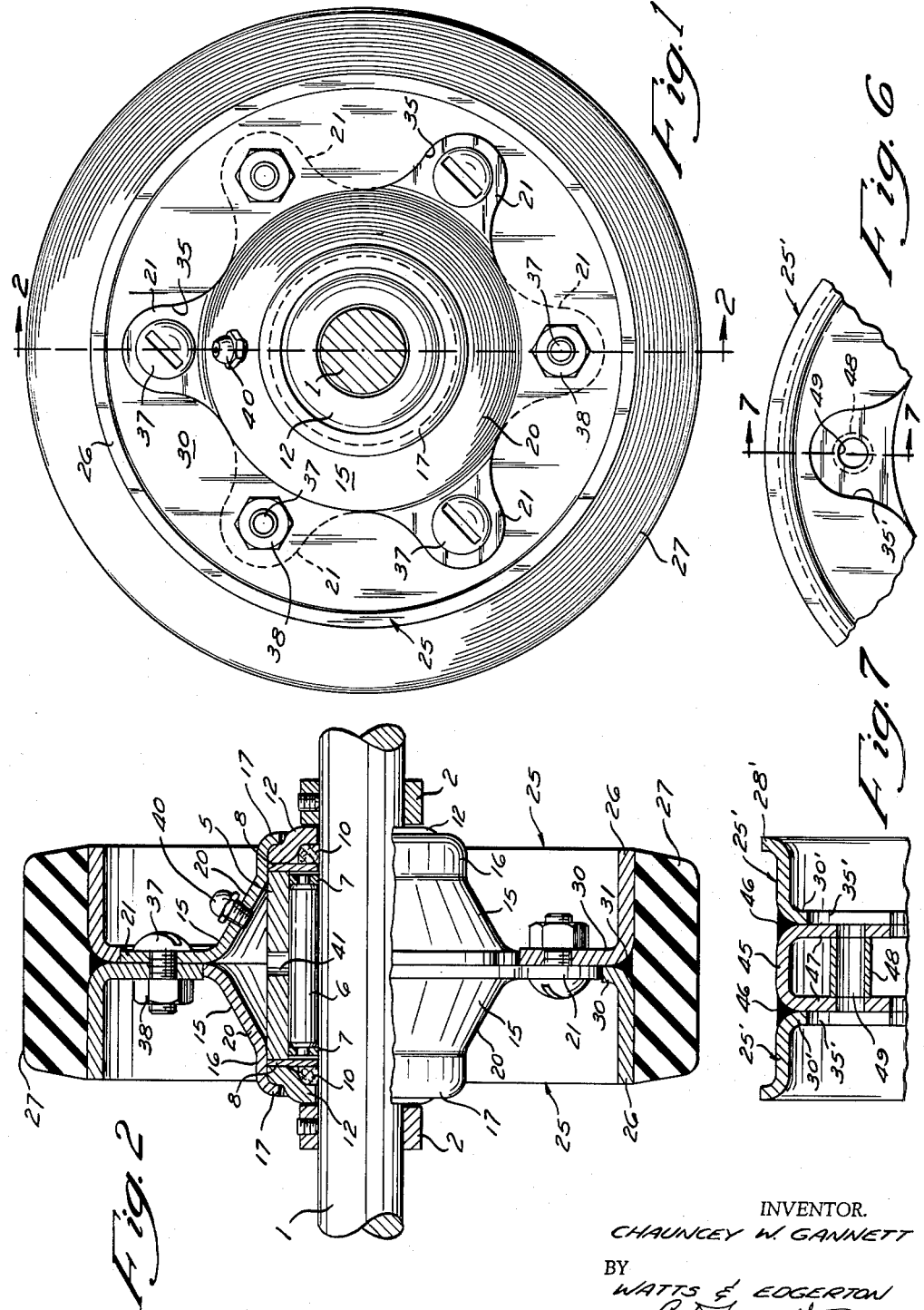
INVENTOR.
CHAUNCEY W. GANNETT
BY
WATTS & EDGERTON
ATTORNEYS May 9, 1961   C. W. GANNETT   2,983,550
WHEEL Filed March 31, 1959   2 Sheets-Sheet 2

INVENTOR.
CHAUNCEY W. GANNETT
BY
WATTS & EDGERTON
ATTORNEYS

United States Patent Office 2,983,550
Patented May 9, 1961

2,983,550

WHEEL

Chauncey W. Gannett, Wellington, Ohio, assignor to Wellington Machine Company, Wellington, Ohio, a corporation of Ohio Filed Mar. 31, 1959, Ser. No. 803,152

6 Claims. (Cl. 301—63)

This invention relates generally to the art of metal wheels and is particularly concerned with a new wheel of the disc type in which the discs interlock with a detachable rim in such a manner that relative rotational movement of these members is thereby prevented and the means which secure those members against lateral displacement is thereby relieved of the duty of preventing relative rotational movement of these members.

Prior metal disc wheels have employed bolts or other suitable securing means to hold the discs in assembled position with each other and with the rim. Those bolts were called upon to perform the dual duty of preventing both lateral and rotational displacement of the disc and rim relative to one another. While such wheels have been used extensively in commerce they possessed certain inherent disadvantages which the present invention aims to overcome. My prior U.S. Patents Nos. 2,110,126 and 2,154,932 are illustrative of such prior art wheels.

The present invention will be better understood by those skilled in the art from the following specification and the drawings which accompany and form a part of it and in which:

Figure 1 is a side elevational view of a wheel embodying the present invention;

Figure 2 is a cross-sectional view taken on line 2—2 of Figure 1;

Figure 6 is a fragmentary side elevational view of a modified form of rim; and

Figure 7 is a cross-sectional view take on line 7—7 of Figure 6.

Figure 4:
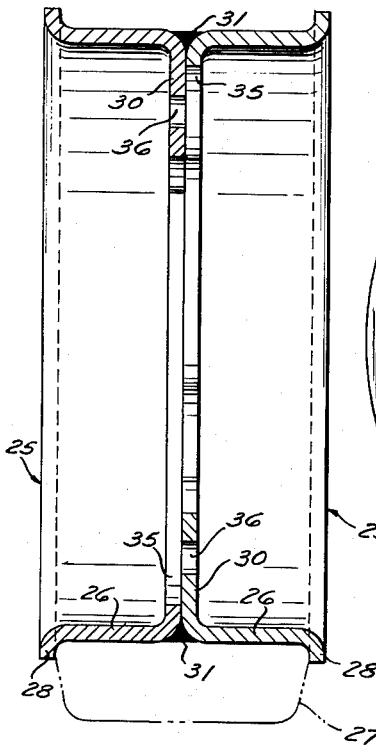
Figure 4 is a cross-sectional view taken on line 4—4 of Figure 3.

In Figures 1 to 5 of the drawing, the shaft 1 has mounted thereon between collars 2 a metal wheel embodying the present invention. That wheel includes a cylindrical hub 5 within which is positioned roller bearings 6 mounted in cages 7. Metal washers 8 are disposed at the ends of hub 5 and have outer peripheral edges substantially flush with the outer cylindrical surface of hub 5 and have inner peripheral edges disposed close to, but out of actual engagement with the cylindrical surface of shaft 1. Lubricant absorbent packing rings 10 surround shaft 1 on the outer axial sides of washers 8 and are retained in position by metal rings 12 which bear against the outer axial surfaces of washers 8, have outer peripheral surfaces substantially flush with the outer cylindrical surface of hub 5 and the outer peripheral edges of rings 12, are deformed outward axially to provide a space for lubricant rings 10, and have the inner peripheral surfaces disposed adjacent to, but out of contact with the cylindrical surfaces of shaft 1.

Similar discs 15 have cylindrical portions 16 which substantially engage the outer cylindrical surface of hub 5, and the outer peripheral edges of washers 8 and retainer rings 12 and have inwardly or radially extending flanges 17 which engage the axially outer side surfaces of rings 12. Preferably rings 12 are pressed into the discs 15 but project axially therefrom to engage collars 2 and space the discs therefrom, and also preferably rings 12 are hardened to resist wear incident to engagement with the collars. It will be seen from the foregoing description that when discs 15 are connected together in assembled position they will receive and retain the assembly of hub 5, bearings 6, cages 7, washers 8, packing rings 10 and retainer rings 12. The collars 2 which are engageable with rings 12 prevent axial movement of the wheel on the shaft.

The discs 15 are of unique construction and arrangement. The discs may be identical and one is shown at 15 in Fig. 5 where the cylindrical portion 16 and the flange 17 are indicated. Each disc has an axially outwardly extending portion 20 which, in this instance, is frusto-conical, and has ears 21 projecting outwardly from its outer periphery at circumferential, equally spaced places. In the illustrated disc the three ears 21 are spaced 120° apart. When two discs are to be assembled they are rotated relative to one another so that each ear 21 of one disc will be positioned mid-way between a pair of ears 21 of the other disc. This arrangement is clearly illustrated in Figures 1 and 2. The full lines in Fig. 3 indicate the ears on the adjacent or front disc and the dotted lines indicate the ears on the remote or rear disc. Each ear has a bolt hole 22 to receive a bolt which serves to connect the discs together and to the rim. Preferably the discs are so shaped in the forming operation that when assembled with the hub assembly, and before being secured together, a small space will exist between the outer parts of the opposed conical portions and the ears so that when the discs are pulled toward one another by the securing means the flanges 17 will press the rings 10, washers 8 and hub 5 together in closely assembled relation.

Figure 3:
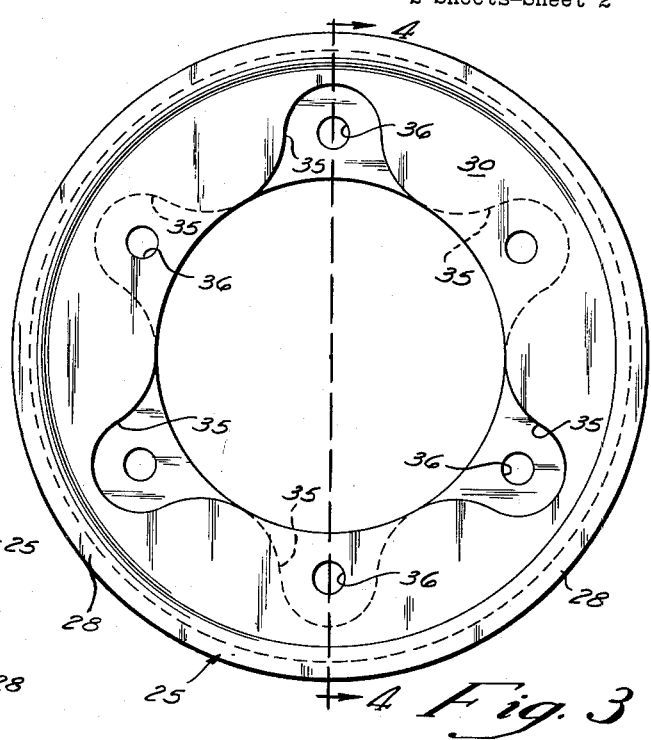
Figure 3 is a side elevational view of the two-ring rim of Figures 1 and 2.
Figure 5:
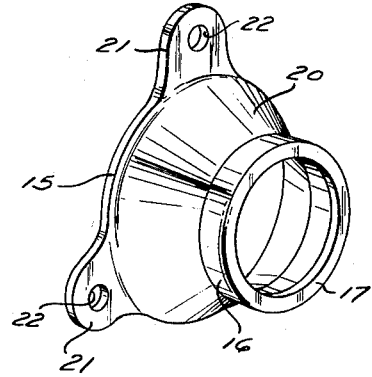
Figure 5 is a perspective view of one of the wheels discs.

The rim shown in Figures 1 and 2 with other parts of the wheel is shown separately in Figures 3 and 4. There the rim is seen to consist of two metal rings 25, each of which has an axially extending portion 26 to which a tire 27 may be fixedly attached, as by molding, and marginal flanges 28 may be employed when added new strength is desired. Each ring also has a transversely or radially extending portion or flange 30. Preferably the rings 25 are connected together as by weld metal 31. Thus the rings and tire constitute a demountable rim unit.

Each flange 30 of rings 25 is provided with a plurality of notches 35 which are so disposed and are of such a size as to receive therein ears 21 with a fairly close fit and each of the flanges 30 is also provided with holes 36 between the notches 35 through which bolts 37 may extend and on which nuts 38 may be screwed. As in the case of the discs 15, the rings 25 are assembled with notches 35 of one flange 30 being aligned with the holes 36 of the other flange 30. The ears 21 of one disc are disposed in notches 35 of the adjacent flange 30 and bear against the side of the other flange 30 with the holes 22 of the ears being aligned with the holes 36 of the flange 30 between notches 35 of that flange.

The wheel of Figures 1 and 2 may be assembled substantially as follows: One disc 15 is positioned horizontally and the rim is placed thereon with the ears of the former being located in the notches on the adjacent rim flange. The bolts may be put in place in the bolt holes and the rings 10, washers 8, hub 5 and bearings 6 may be placed in the disc. Then the other disc may be placed on the rim and hub assembly with the ears of that disc being located in the notches of the adjacent rim flange. When the nuts are screwed on the bolts, the discs will be clamped against the rim and hub assembly, and those parts will be maintained against lateral movement relative to each other. In the form illustrated in Figures 1 to 5 where each disc is provided with three ears, the ears of one disc are positioned 60° from each of the two adjacent ears of the other disc.

It will be understood that since the ears of each disc are disposed in notches in the adjacent rim flanges, the rim and discs will be maintained against relative rotational movement by such engagement of the ears and notches. It will also be understood that by reason of this arrangement of parts and the fact that the rim rings are connected together as by weld metal 31, the bolts 37 have little or no part to play in preventing relative rotational movement of the rim and discs.

Means for lubricating the wheel of Figures 1 and 2 is shown at 40 where a lubricant conducting nipple extends through the conical part of one disc and into the space between the two discs and the hub 5. A passage 41 through hub 5 serves to conduct lubricant to the bearings. Such lubricant is prevented from escape along the shaft 1 by the packing rings 10.

The present invention contemplates the provision of rims which may be provided with two or more tires. Such a modification is shown in Figures 6 and 7 where rings 25' quite like rings 25 of Figure 4 are employed. However, these rings 25' are spaced apart axially by a metal filler ring 45 which may be connected to rings 25', as by weld metal 46. Ring 45 is U-shaped in cross section and between its parallel inwardly extending flanges 47, tubular spacers 48 are positioned in alignment with holes therethrough to receive bolts similar to, but longer than bolts 37 of Figure 2 for the purpose of securing the rim in assembled position with the wheel discs. In this instance it will be noted that the notches 35' of the rings 25' are aligned with each other and with the opening 49 through spacer 48. Since the notches 35' of the rings 25' are aligned with one another, the ears 21 of the wheel discs with which this rim is to be assembled will be aligned with one another, and not circumferentially spaced as shown in Figure 1. In that event the bolts used to secure the rim and disc together, by passing through spacers 48, will clamp the ears of the discs against the outer side surfaces of ring 45.

It will be understood that instead of providing the same number of bolts as there are ears on one of the discs, as just described, ring 45 may be provided with twice as many bolt holes and the flanges 30' of the rim rings 25' may also be provided with bolt holes spaced equally far apart from notches 35'. In such case each bolt will pass through one ear of one disc and a bolt hole in the other disc substantially as is shown in Figures 1 and 2.

From the foregoing disclosure it will be understood that wheels embodying the present invention possess many advantages. One of such advantages is that the rim may be readily removed from the discs without disturbing one disc and the hub assemblies. Such ease of removal of a rim and replacement with another is of considerable advantage in the saving of maintenance time.

Another advantage is that the rim rings may be substantial duplicates and the discs may be substantial duplicates, thus reducing the cost of manufacture appreciably.

A further advantage is that one rim ring and one disc may be made from a single metal blank by drawing and shearing. Furthermore, any desired metal including mild steel, stainless steel and aluminum alloys may be used for these parts.

Another advantage is that because of the unique design of rim rings and discs and the above described shaping of the discs, the rim and discs may be clamped together so as to prevent lateral displacement of the parts and to insure retention of the hub assembly, both of these functions being performed by a single set of securing means.

It will be understood that still another advantage is that wheels of a wide range in diameter may be made with a single set of disc dies simply by varying the radial length of the flanges of the rim rings. Similarly, wheels of different axle lengths can also be made by this invention, as is illustrated in Figures 6 and 7 where a ring is interposed between two rim rings and the discs are clamped against that rim rather than against each other as in Figure 2.

Another advantage of the present invention is that the complete wheel may be completely assembled at the factory and shipped without danger that any of the parts will be lost in transit. Since the discs 15 hold the parts of the hub assembly in assembled position with each other and with the discs, none of those parts can become dislodged in shipment.

It will be understood that the rims of both illustrated modifications of this invention are demountable and that they may be demounted singly simply by removing one disc and the nuts on the bolts, whereupon another rim may be mounted on the undisturbed disc as described above.

Preferably the tire is attached to the rim by being molded or bonded thereto by heat and any suitable tire material may be used including compounds of natural rubber, synthetic rubber, synthetic resins and other synthetic polymers.

Having thus described this invention in such full, clear, concise and exact terms as to enable any person skilled in the art to which it pertains to make and use the same, and having set forth the best mode contemplated of carrying out this invention, I state that the subject which I regard as being my invention is particularly pointed out and distinctly claimed in what is claimed, it being understood that equivalents or modifications of, or substitutions for, parts of the above specifically described embodiments of the invention may be made without departing from the scope of the invention as set forth in what is claimed.

What is claimed is:

1. A metal wheel comprising two discs having ears projecting outwardly from the outer peripheries thereof, a demountable rim having an axially extending portion and a tire molded thereon, and a radially extending portion having circumferentially spaced, axially unaligned notches extending only part way therethrough from opposite sides thereof to receive said ears and means extending through said ears and radial portions and serving to maintain the discs and rim in assembled position against lateral separation, said ears and notches serving to position the rim and discs against circumferential displacement.

2. A metal wheel comprising two discs having ears projecting outwardly from the outer peripheries thereof, a demountable rim including at least two metal rings having axially extending portions and a tire molded thereon and radially extending flanges having notches to receive said ears, said notches of one ring being spaced circumferentially from the notches of the other ring, and means extending through each of said ears and the opposed flange and serving to maintain the discs and rim in assembled position against lateral separation, said ears and notches serving to position the rim and discs against circumferential displacement.

3. A metal wheel comprising a hub assembly, two discs engaging said assembly radially and axially, and having ears projecting outwardly from the outer peripheries thereof, a demountable rim having an axially extending portion for a tire and including two radially extending flanges having notches to receive said ears, said notches of one flange being spaced circumferentially from the notches of the other flange, the ears of one disc being positioned in the notches of the adjacent flange and bearing against the other flange between its notches and means extending through each of said ears and through the opposed flange and serving to clamp the discs axially against the ends of said hub assembly and to maintain the discs and rim in assembled position against lateral separation, said ears and notches serving to position the rim and discs against circumferential displacement.

4. A metal wheel comprising a tubular hub, two discs having inner portions to receive said hub therebetween and outer portions provided with circumferentially spaced peripheral ears, a demountable rim including at least two metal rings having axially extending portions and a tire molded thereon and radially extending flanges having notches to receive said ears, said notches of one ring being spaced circumferentially from the notches of the other ring, circumferentially spaced bolt holes between said ears, the ears of each disc being positioned in the notches of one ring and bearing against the other ring between its notches and means extending through said ears and rings and serving to maintain the disc in assembled position with the hub and rim against relative lateral movement, said ears and notches serving to position the rim and discs against circumferential displacement.

5. A metal wheel comprising a hub assembly including a tubular hub, bearings within the hub and rings at the axial end of the hub, two discs having cylindrical inner portions to receive said hub assembly and engage the hub and rings thereof and conical portions, provided with circumferentially spaced peripheral ears having bolt holes therethrough, a demountable rim including at least two metal rings having axially extending portions and a tire molded thereon and radially extending flanges having notches to receive said ears and circumferentially spaced bolt holes between said notches, the metal rings being positioned with the notches of one flange between the notches of the other flange, and the ears of each disc being positioned in the notches of the flange of the adjacent ring and bearing against the flange of the opposed ring between its notches with the bolt holes of one flange being aligned with the bolt holes of the ears of the other disc and securing means including bolts extending through the ears of said discs and the bolt holes of the rim flanges, said bolts serving to maintain the discs and rim in assembled position and against lateral separation, said ears and notches serving to position the rim and discs against circumferential displacement.

6. A metal wheel comprising a tubular hub, two discs having cylindrical inner portions to receive and seat on the hub and flanges extending inward radially at the ends of said hub, conical intermediate portions provided with outwardly projecting circumferentially spaced peripheral ears provided with bolt holes extending therethrough, a demountable rim including two metal rings connected together and having axially extending portions and a tire molded thereon and radially extending flanges having notches to receive the ears of said discs and circumferentially spaced bolt holes between said ears, said rings being positioned with the notches in the flange of one ring being positioned between the notches in the flange of the other ring and with the ears of one disc being disposed in the notches of one flange and bearing against the other flange between its notches and securing means including bolts extending through ears of the discs and bolt holes of the flanges and serving to maintain the discs and rim in assembled position against lateral separation of the discs and relative movement of the discs and rim, said ears and notches serving to position the rim and discs against circumferential displacement.

References Cited in the file of this patent

UNITED STATES PATENTS

| | | |
|---|---|---|
| 1,004,023 | Heibeck | Sept. 26, 1911 |
| 1,320,534 | Culp | Nov. 4, 1919 |
| 1,980,479 | Gannett | Nov. 13, 1934 |
| 2,110,126 | Gannett | Mar. 8, 1938 |
| 2,559,975 | Lange | July 10, 1951 |